United States Patent [19]
Roger

[11] Patent Number: 6,105,439
[45] Date of Patent: Aug. 22, 2000

[54] DEVICE FOR MEASURING THE AXIAL THRUST ON A ROTATING SHAFT

[75] Inventor: Christian Marie Michel Roger, Bois Colombes, France

[73] Assignee: Societe Hispano Suiza, Paris, France

[21] Appl. No.: 09/197,206

[22] Filed: Nov. 20, 1998

[30] Foreign Application Priority Data

Nov. 20, 1997 [FR] France ................................ 97 14555

[51] Int. Cl.[7] ............................................ G01L 5/12
[52] U.S. Cl. ................................ 73/862.49; 73/862.392
[58] Field of Search ........................ 73/862.849, 862.51, 73/862.29, 862.31, 862.392

[56] References Cited

U.S. PATENT DOCUMENTS

| | | | |
|---|---|---|---|
| 4,093,192 | 6/1978 | Riegler et al. | 266/78 |
| 4,419,901 | 12/1983 | Ruppert et al. | 73/862.49 |
| 4,509,375 | 4/1985 | Davis . | |
| 4,885,944 | 12/1989 | Yagi et al. | 73/862.335 |
| 5,115,558 | 5/1992 | Bernhardt et al. | 29/705 |
| 5,650,573 | 7/1997 | Bruns et al. | 73/862.21 |

FOREIGN PATENT DOCUMENTS

| | | |
|---|---|---|
| 0 290 651 | 11/1988 | European Pat. Off. . |
| 2 442 436 | 6/1980 | France . |
| 2 666 894 | 3/1992 | France . |

*Primary Examiner*—Max Noori
*Attorney, Agent, or Firm*—Oblon, Spivak, McClelland, Maier & Neustadt, P.C.

[57] ABSTRACT

The axial thrust exerted on a rotating shaft, such as the shaft of a turbomachine rotor, is measured by a device comprising a resilient washer sandwiched between two flange members disposed around the shaft so that the axial thrust will cause axial compression of the washer between the two flange members, and displacement-measurement probes secured to a fixed structure for measuring the displacements of the flange members so that the axial thrust can be determined from the difference between the displacements and corresponding to the change in thickness of the resilient washer.

4 Claims, 1 Drawing Sheet

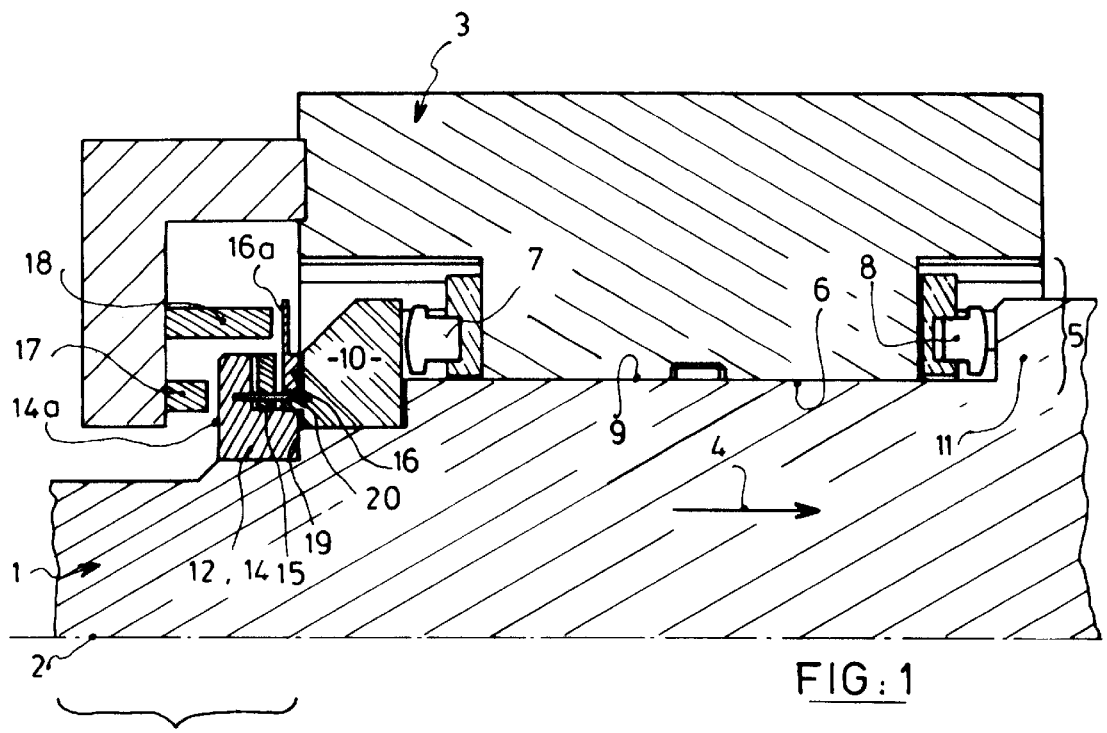
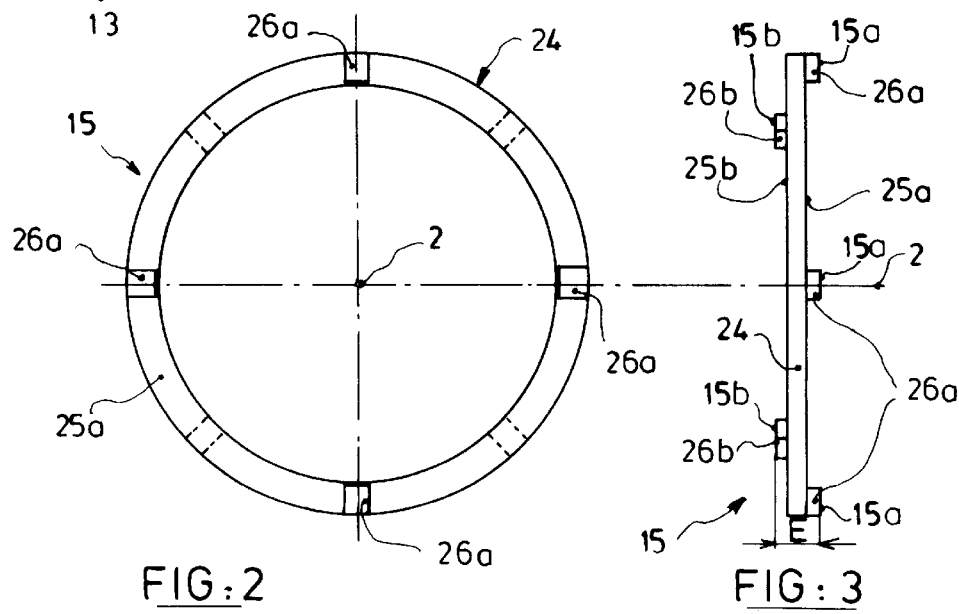

DEVICE FOR MEASURING THE AXIAL THRUST ON A ROTATING SHAFT

BACKGROUND OF THE INVENTION

1. Field of the invention

The invention relates to the measurement of forces, and more particularly to a device for measuring the axial thrust exerted between a rotating shaft and a fixed structure supporting the shaft via a bearing.

Improving the performance and control of machines involves measuring parameters that represent their behavior, either in the context of spot checks or in the case of measurements taken continuously during the operation of the machine.

The need to measure the axial thrust exerted between a rotating shaft and the fixed structure supporting it is particularly, although not exclusively, present in the case of turbomachines such as industrial turbines or turboshaft aero-engines. The components involved are usually a shaft or a rotor connected to the fixed structure by at least one bearing which acts as a thrust bearing.

2. Summary of the prior art

Numerous devices that enable such measurements to be made are known. One of the most widespread comprises an axially deformable link between the bearing and the fixed structure, and means for measuring the deformation and for deducing therefrom the axial thrust which caused it.

It will be understood that such devices need to be provided for at the machine design stage, and will affect the design because of their size and the constraints they impose.

SUMMARY OF THE INVENTION

The problem to be solved is to provide a device for measuring the axial thrust exerted on a rotating shaft which is easily installed in new or existing hardware with minimal modifications to the hardware, and which will also take up the smallest possible amount of space.

Accordingly, the invention provides a device for measuring the axial thrust exerted between a rotary shaft and a fixed structure in which said rotary shaft rotates about a geometric axis of rotation and is guided with respect to said fixed structure by at least one bearing including a rotary abutment which bears the axial thrust, said device comprising:

axial connection means active by thrust on said rotary abutment and taking up said axial thrust, said rotary abutment being capable of an axial displacement along said rotary shaft;

first and second flange members disposed between said axial connection means and said rotary abutment, said flange members each having a measurement side facing in the sa me direction;

a resilient washer disposed between said first and second flange members, said washer having oppositely facing flanks for contact by said flange members;

first and second displacement-measuring probes rigidly secured to said fixed structure so that said first probe faces the measurement side of said first flange member and said second probe faces the measurement side of said second flange member in order to measure the displacement of the first and second flange members relative to said fixed structure; and means for calculating the difference between the displacement measurements made by said probes and resulting from axially compressive deformation of said resilient washer in response to the axial thrust exerted during rotation of said rotary shaft and for determining the value of said axial thrust from said difference.

Such a measurement device is of relatively small size and can easily be incorporated around the shaft in an existing machine or a machine that is in the course of being designed. It requires no modifications to the shaft or to the fixed structure other than the means needed to attach the elements of the device.

The invention also has the advantage of not weakening the shaft or the assembly consisting of the fixed structure and the bearing. What is more, the resilient washer can naturally withstand a compressive force P that is very much higher than the compressive forces P corresponding to its range of elastic deformation. Thus, an abnormal increase in P cannot therefore cause any breakage of the components of the invention. What is more, such an abnormal increase in P will cause only a minimal shift in the axial position of the shaft.

With the device of the invention, the axial thrust transmitted between the rotating shaft and the fixed structure passes in turn through the axial connection means on the rotary shaft, the first flange member, the resilient washer, the second flange member, the rotary abutment and the thrust bearing itself which transmits the axial force to the fixed structure. Thus, the resilient washer is placed in compression by the axial thrust, and this has the effect of deforming it and allowing the two flange members to move closer together. This movement closer together $\Delta E$ is equal to the difference between the axial displacements E1 and E2 of the two flange members, E1 and E2 being measured by the two displacement probes secured to the fixed structure. If the axial stiffness of the resilient washer is denoted K, then the axial thrust P is given by the relationship:

$$P = K \times \Delta E$$

with: $\Delta E = (E2 - E1)$

Thus, the device makes it possible to measure the axial thrust without having to form deformation zones in the fixed structure or in the shaft, and this preserves their integrity. The resilient washer and the flange members allowing its change in thickness to be measured using the displacement probes do not require a great deal of space and can easily be installed on the periphery of the shaft.

Preferably, the resilient washer and the flange members will be arranged at the outer end of the bearing, so as to make use of the space surrounding the shaft at this point.

Also, the displacement measuring probes will preferably be contactless probes of the Eddy-current type. These probes are of small-size and can easily be installed in the machine. They also have good sensitivity, of the order of 10 mV/$\mu$m, so that it is possible to use a very hard resilient washer which will cause only a very small and therefore negligible axial displacement of the rotating member under load.

In a preferred embodiment the resilient washer, of overall thickness E, comprises an annular web having first and second oppositely facing sides, at least two bosses on said first side, and at least two bosses on said second side arranged in a staggered configuration with respect to the bosses on said first side, said oppositely facing flanks of said resilient washer being defined by the axially facing surfaces of said bosses on said first and second sides of said web. This arrangement has the effect of bringing about the variation $\Delta E$ of the overall thickness E by the alternate bending of the web between the bosses, and the result of allowing the use of a resilient washer which offers a very broad range of stiffnesses for a very small size.

The invention will now be described in greater detail in the context of a preferred embodiment, given by way of example only, and with reference to the appended drawings.

BRIEF DESCRIPTION OF THE DRAWINGS

FIG. 1 shows a half axial sectional view of one embodiment of the invention installed on a rotary shaft and a fixed structure supporting the shaft.

FIG. 2 shows an axial face view of the resilient washer used in the embodiment of FIG. 1.

FIG. 3 is a side edge view of the resilient washer shown in FIG. 2.

DESCRIPTION OF THE PREFERRED EMBODIMENT

FIG. 1 shows a rotary shaft 1 which rotates about a geometric axis of rotation 2 within a fixed structure 2 of a machine. During rotation the shaft 1 exerts an axial thrust on the fixed structure 3 in the direction of arrow 4, the thrust having a value P which needs to be measured. The shaft 1 is guided in its rotation, and positioned in terms of translation, by a hydrostatic bearing 5 comprising a fixed cylindrical bore 6 flanked by two oppositely facing thrust stops 7 and 8. The cylindrical bore 6 surrounds a cylindrical bearing surface 9 provided on the rotary shaft 1 and thus cooperates with said cylindrical bearing surface 9 to guide the rotation of the rotary shaft 1. The bearing 5 also comprises two rotary abutments 10 and 11 disposed on the shaft 1 facing the fixed thrust stops 7 and 8 respectively so as to cooperate therewith to position the shaft 1 in terms of translation with respect to the fixed structure 3. The rotary abutment 10 in this embodiment transmits the thrust 4, and is naturally placed on the side ot the bearing 5 which is opposed to the direction of the axial thrust 4. The abutment 10 is held on the shaft by a nut 12 acting as axial connection means, said nut 12 being screwed onto the rotary shaft 1 and transmitting the axial thrust 4 to the rotary abutment 10. The second rotary abutment 11, located at the other side of the bearing 5, in this embodiment is constituted by a step formed on the rotary shaft 1.

In accordance with the invention, the rotary abutment 10 which transmits the thrust 4 is mounted so that it can slide along the rotary shaft 1. A small amount of axial travel is sufficient. The nut 12 is formed integrally with a first flange member 14 and provides a first measurement side 14a facing in the opposite direction to the direction in which the axial thrust 4 is exerted, this first measurement side 14a having the form of a flat annular face perpendicular to the geometric axis 2. Arranged in succession around the rotary shaft 1 between the nut 12 and the rotary abutment 10 adjacent the outer end 13 of the bearing 5 are a resilient washer 15 and a second flange member 16 defining a second measurement side 16a facing in the same direction as the first measurement side 14a, this second measurement side 16a also having the form of a flat annular face perpendicular to the geometric axis 2. Two displacement measuring probes 17 and 18 are secured to the fixed structure 3 and are arranged to face the first and second measurement sides 14a and 16a respectively of the nut 12 and the second flange member 16. It will be noted that the nut 12 comes to bear against a step 19 formed on the rotary shaft 1 so as to accurately position the rotary abutment 10 axially.

The way in which the assembly works is as follows. The axial thrust 4 exerted on the rotary shaft 1 is transmitted to the fixed structure 3 via the nut 12 and first flange member 14 formed thereby, the resilient washer 15, the second flange member 16, the rotary abutment 10 and the fixed thrust stop 7, in turn. Under the effect of the axial thrust 4, the resilient washer 15 is axially compressed, and this causes the measurement sides 14a and 16a of the first flange member 14 (formed by the nut 12) and the second flange member 16 to move closer together. This movement is measured by calculating the difference between the measurements taken by the measurement probes 17 and 18 relative to the measurement sides 14a and 16a respectively.

Preferably, the nut 12 and the rotary abutment 10 are rotationally connected, for example by means of a pin 20.

Turning now to FIGS. 2 and 3 it will be seen that the resilient washer 15 comprises an annular web 25 of rectangular section with two oppositely facing sides 25a and 25b on each of which are arranged equidistant bosses 26a and 26b respectively, the bosses 26a on the side 25a being arranged in a staggered configuration with respect to the bosses 26b on the other side 25b. The axially facing surfaces 15a and 15b of the bosses 26a and 26b respectively constitute the opposite flanks 15a and 15b of the resilient washer 15 which are in contact with the flange members 14 and 16. Under the effect of the axial thrust 4, the web 25 deforms alternately and axially between the bosses 26a and 26b, and this produces a variation $\Delta E$ in the overall thickness E of the resilient washer 15 as a function of the value P of the thrust 4. It will be appreciated that the stiffness K of the resilient washer 15 can be adjusted very simply by altering the thickness of the web 25, its width, and the number of bosses 26a, 26b.

It will also be appreciated that the invention is not restricted to the particular embodiment which has been described. For example, the flange members 14, 16 may be distinct parts or they may have their function fulfilled by the nut 12 and the rotary abutment 10.

Also, the axial connection means, which in the embodiment shown is the nut 12, may be constituted by any equivalent means, such as a step machined in the rotary member. In this case, the function of the first flange member 14 would preferably be fulfilled by this step, on one flank of which the first measurement side 14a would be machined.

It will also be noted that the invention is applicable to any type of bearing, such as a hydrodynamic bearing, a rolling-contact bearing or a plain bearing in which the rotating race fulfills the function of the rotary abutment 10.

I claim:

1. A device for measuring the axial thrust exerted between a rotary shaft and a fixed structure in which said rotary shaft rotates about a geometric axis of rotation and is guided with respect to said fixed structure by at least one bearing including a rotary abutment which bears the axial thrust, said device comprising:

axial connection means active by thrust on said rotary abutment and taking up said axial thrust, said rotary abutment being capable of an axial displacement along said rotary shaft;

first and second flange members disposed between said axial connection means and said rotary abutment, said flange members each having a measurement side facing in the same direction;

a resilient washer disposed between said first and second flange members, said washer having oppositely facing flanks for contact by said flange members;

first and second displacement-measuring probes rigidly secured to said fixed structure so that said first probe faces the measurement side of said first flange member and said second probe faces the measurement side of said second flange member in order to measure the displacement of the first and second flange members relative to said fixed structure; and means for calculating the difference between the displacement measurements made by said probes and resulting from axially compressive deformation of said resilient washer in response to the axial thrust exerted during rotation of said rotary shaft and for determining the value of said axial thrust from said difference.

2. The device as claimed in claim 1, wherein said resilient washer and said flange members are disposed on said on said shaft at the outer end of said bearing.

3. The device as claimed in claim 1, wherein said displacement-measuring probes are Eddy-current probes.

4. The device as claimed in any one of claims 1 to 3, wherein said resilient washer comprises an annular web having first and second oppositely facing sides, at least two bosses on said first side, and at least two bosses on said second side arranged in a staggered configuration with respect to the bosses on said first side, said oppositely facing flanks of said resilient washer being defined by the axially facing surfaces of said bosses on said first and second sides of said web, whereby axially compressive deformation of said resilient washer to vary the overall thickness thereof occurs by alternate bending of said web between said bosses.

* * * * *